United States Patent [19]

Watanabe

[11] 4,243,123
[45] Jan. 6, 1981

[54] DEVICE FOR PREVENTING RATTLING OF PADS IN DISC BRAKES

[75] Inventor: Mamoru Watanabe, Tokyo, JPX

[73] Assignee: Watanabe Engineering Co., Ltd., Tokyo, Japan

[21] Appl. No.: 29,149

[22] Filed: Apr. 11, 1979

[30] Foreign Application Priority Data

Sep. 29, 1978 [JP] Japan .......................... 53-133937[U]

[51] Int. Cl.³ .............................................. F16D 65/00
[52] U.S. Cl. .................................. 188/73.5; 192/30 V
[58] Field of Search ........................ 188/73.5, 205 A; 192/30 V

[56] References Cited

U.S. PATENT DOCUMENTS

| 3,190,398 | 6/1965 | Evans | 188/73.5 x |
| 3,403,756 | 10/1968 | Thirion | 188/205 A x |
| 3,954,158 | 5/1976 | Rist | 188/73.5 x |
| 3,998,296 | 12/1976 | James | 188/73.5 |

FOREIGN PATENT DOCUMENTS

| 2122240 | 11/1977 | Fed. Rep. of Germany | 188/73.5 |
| 2225178 | 1/1974 | Fed. Rep. of Germany | 188/73.5 |

Primary Examiner—George E. A. Halvosa
Attorney, Agent, or Firm—Cantor and Singer

[57] ABSTRACT

A device for preventing rattling of a friction pads in disc brakes, in which a resilient member for avoiding rattling is interposed between the outer periphery of the friction pad and the inner surface of a portion for receiving the pad. The pad-receiving portion is formed in a caliper body.

4 Claims, 3 Drawing Figures

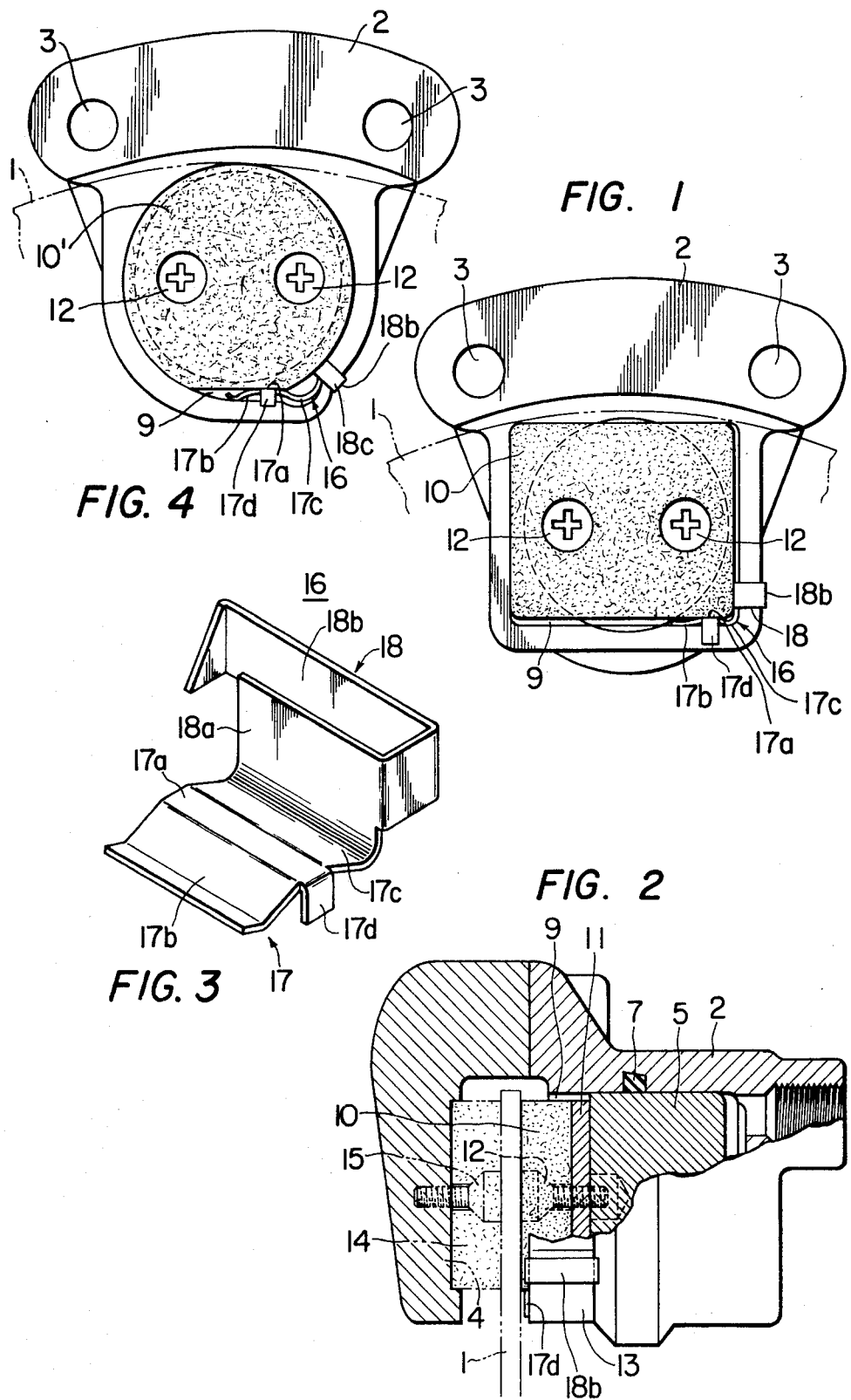

DEVICE FOR PREVENTING RATTLING OF PADS IN DISC BRAKES

BACKGROUND OF THE INVENTION

The present invention relates generally to a disc brake including a caliper body arranged to stride over a disc and a pair of friction pads adapted to apply pressure to the disc from its both sides to exercise a damping effect thereon, and more particularly to a device for preventing rattling of the pads.

In the known disc brake in which a friction pad is received in a pad-receiving portion formed in a caliper body so that the friction pad is retained on the receiving portion to bear a braking torque on the latter, the inner surface of the pad-receiving portion is either kept in a casted state or further processed. In either case, however, a given tolerance causes a gap to be formed between the inner surface of the pad-receiving portion and the friction pad, which is responsible for the generation of a rattling noise due to vibrations or rocking movement of the vehicle body and a brake squeal in braking. In addition, the pad-receiving portion as casted is disadvantageous in that its inner surface, is too poor in accuracy to permit smooth sliding of the friction pad. For these reasons, the pad-receiving portion is often processed. However, it is particularly difficult to process the portion for receiving a square friction pad since its inner surface is of a square shape, resulting in a rise in the production cost etc.

SUMMARY OF THE INVENTION

The present invention aims at overcoming the defects as mentioned above. It is therefore an object of the present invention to prevent generation of a rattling noise caused due to vibrations or rocking movement of a vehicle body and to eliminate any brake squeal in braking by interposing a resilient member for preventing rattling between the outer periphery of a friction pad formed in a caliper body and the inner surface of a pad-receiving portion to avoid rattling of them.

BRIEF DESCRIPTION OF THE DRAWINGS

The present invention will now be explained with reference to one embodiment of the disc brakes making use of square friction pads, which is illustrated in the accompanying drawings wherein:

FIG. 1 is a plan view of the disc brake according to the present invention;

FIG. 2 is a sectional side view of the same; and

FIG. 3 is a perspective view of the resilient member for preventing rattling.

DETAILED DESCRIPTION OF THE INVENTION

In the drawings, reference numeral 1 stands for a disc spline-jointed to an axle such that it turns integrally with the wheels of a vehicle; and 2 a caliper body arranged to stride over disc 1, which is clamped to a fixing section 4 of a vehicle body by means of bolts passing through openings 3 and 3 provided therein. Numeral 5 represents a piston slidably provided within a cylinder (not shown) formed in the caliper body 2; and 7 a piston seal provided in the cylinder.

Numeral 9 denotes a pad-receiving portion as casted and formed into a square shape on the edge of the cylinder; 10 a square friction pad accommodated in the pad-receiving portion 9; and 11 a rear plate therefore; said pad 10 being fixed to the rear plate 11 by means of a fixing screw 12. This square friction pad 10 is then movable by piston 5 so that it comes in pressure contact with disc 1 to bear a braking torque on the pad-receiving portion 9. Numeral 13 stands for a collar portion formed on the outside of the pad-receiving portion 9 in the caliper body 2.

Numeral 14 is a square friction pad clamped to the fixing section 4 of the vehicle body by a fixing screw 15.

Numeral 16 is a resilient member for avoiding rattling, which is defined into an integral piece by a spring portion 17 and a mounting portion 18. The spring portion 17 comprises a surface 17a for applying pressure to the pad to slidably guide it, wing-shaped pieces 17b and 17c formed on the right and left sides thereof and caused to extend downwardly and a resilient stop piece 17d for guiding the pad, which is caused to extend in front of said guide surface 17a and is in turn bent. The mounting portion 18 comprises a vertical piece 18a which is formed by elongating the end of one wing-shaped piece 17c of the spring portion 17 and a stop piece 18b formed by elongating and bending the front side of said vertical piece 18a, which is adapted to embrace said collar portion 13. The spring portion 17 is interposed between the outer lower portion of the friction pad 10 and the inner bottom portion of the pad-receiving portion 9, and the vertical piece 18a of the mounting portion 18 is interposed between the outer side of the friction pad 10 and the inner side of the pad-receiving portion 9. In addition, the resilient member 16 is fixedly mounted on the caliper body 2 such that the stop piece 18b of the mounting portion 18 embraces the collar portion 13.

Consequently, the ends of the wing-shaped pieces 17b and 17c of the spring portion 17 come in resilient contact with the inner bottom portion of the pad-receiving portion 9 so that the friction pad 10 is resiliently supported by the surface 17a for applying pressure to the pad to slidably guide it. Any gap between the outer periphery of the friction pad 10 and the inner surface of the pad-receiving portion 9 is then eliminated, thus allowing smooth sliding of the friction pad 10 on the surface 17a for slidably guiding it.

In mounting the friction pad 10 on the pad-receiving portion 9, the friction pad 10 may be guided from the shoulder portion of the resilient stop piece 17c for guiding the pad for attainment of easy mounting thereof on the rod-receiving portion 9.

While the foregoing embodiment is designed to prevent the square friction pad 10 from rattling due to vertical vibrations by interposing the spring portion 17 of the resilient member 16 between the lower peripheral surface of the square friction pad 10 and the inner surface of the bottom portion of the pad-receiving portion 9, it may be possible to prevent rattling of the pad due to horizontal vibrations by interposing the resilient member 16 between the outer side of the square friction pad 10 and the inner side of the pad-receiving portion 9.

In FIG. 4 there is shown a round friction pad 10' mounted in pad receiving portion 9 with resilient member 16 mounted in the same manner as in FIG. 1.

In addition, it may be possible to prevent rattling of the pad due to the vertical and horizontal vibrations by forming a spring portion on the side of the mounting portion 18 of the resilient member 16.

It will be appreciated that the present invention is applicable not only to the disc brake using the square friction pad, but also to a disc brake using a round friction pad and adapted to bear a braking torque on the portion for receiving it. Furthermore, the pad-receiving portion may be either kept in a casted state or further processed.

It goes without saying that, as the resilient member for preventing rattling, use may be made of any material of suitable shape which permits smooth sliding of the friction pad.

Thus, according to the present invention, the resilient member for preventing rattling which is interposed between the outer periphery of the friction pad and the inner surface of the pad-receiving portion mitigates the rattling taking place between the friction pad and the pad-receiving portion due to the vertical or horizontal vibrations or rocking movement of a vehicle body, resulting in the positive prevention of generation of any rattling noise. This also ensures that, when the friction pad vibrates during braking, it is prevented from vibrating sympathetically with other parts by said resilient member, thus leading to the effective removal of any brake squeal. The inner surface of the pad-receiving portion may be kept in a casted state without the need of any processing, and the mounting of the friction pad is very easy. Thus the present invention affords a great practical value.

What is claimed is:

1. In a disc brake including a caliper body arranged to stride over a disc and having a friction pad receiving portion, and a pair of friction pads for applying pressure to the disc from its both sides to exercise a braking effect thereon, said friction pad receiving portion having an opening defining top, bottom, and side inner surfaces, a device for preventing a friction pad from rattling, said device comprising a flat elongated pad bottom supporting surface, a flat elongated pad side guiding surface, a resilient portion extending downwardly from each side of said supporting surface and then upwardly, the upwardly extending part of one of said resilient portions merging into said guiding surface, and a mounting portion cooperating with said guiding surface to mount said device on said caliper body in a lower corner of said pad receiving portion with said resilient portions engaging said bottom surface, said device being mounted such that the lower edge of one of said pads, adjacent one lower corner thereof, rests on said supporting surface, and the side edge adjacent said lower corner bears against said guiding surface, whereby said pad slides along said supporting and guiding surfaces when said brakes are activated or deactivated and said resilient portions engagement with said bottom surface bias said pad into engagement with said top surface to prevent rattling.

2. A device as claimed in claim 1, wherein said device prevents said friction pad from rattling due to vertical vibrations.

3. A device as claimed in claim 1, wherein said device prevents said friction pad from rattling due to horizontal vibrations.

4. A device as claimed in any one of claims 1, 2, or 3 wherein said friction pad is of a square or round shape.

* * * * *